US012155125B2

(12) United States Patent
Zhang

(10) Patent No.: US 12,155,125 B2
(45) Date of Patent: Nov. 26, 2024

(54) ELECTRONIC DEVICE AND METHOD FOR FABRICATING ANTENNA RADIATOR

(71) Applicant: GUANGDONG OPPO MOBILE TELECOMMUNICATIONS CORP., LTD., Dongguan (CN)

(72) Inventor: Haojun Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 401 days.

(21) Appl. No.: 17/681,049

(22) Filed: Feb. 25, 2022

(65) Prior Publication Data

US 2022/0181793 A1 Jun. 9, 2022

Related U.S. Application Data

(63) Continuation of application No. PCT/CN2020/115353, filed on Sep. 15, 2020.

(30) Foreign Application Priority Data

Sep. 23, 2019 (CN) ......................... 201910900516.4

(51) Int. Cl.
*H01Q 21/28* (2006.01)
*H01Q 1/24* (2006.01)

(52) U.S. Cl.
CPC ............. *H01Q 21/28* (2013.01); *H01Q 1/243* (2013.01)

(58) Field of Classification Search
None
See application file for complete search history.

(56) References Cited

U.S. PATENT DOCUMENTS

2011/0248895 A1 10/2011 Bungo et al.
2014/0285385 A1 9/2014 Aoki et al.
2015/0123851 A1 5/2015 Bohrer et al.
(Continued)

FOREIGN PATENT DOCUMENTS

CN 202495569 U 10/2012
CN 103633424 A 3/2014
CN 203521599 U 4/2014
(Continued)

OTHER PUBLICATIONS

International Search Report and the Written Opinion Dated Dec. 10, 2020 from the International Searching Authority Re. Application No. PCT/CN2020/115353, 14 pages.
(Continued)

*Primary Examiner* — Frantz Bataille
(74) *Attorney, Agent, or Firm* — BAYES PLLC

(57) ABSTRACT

An electronic device and a method for fabricating an antenna radiator are provided. The electronic device includes a circuit board, a support, a back cover, and a first antenna radiator located on the support, and a second antenna radiator located on one side of the back cover. The first antenna radiator and the second antenna radiator are electromagnetically coupled and connected. The first antenna radiator is able to radiate a wireless signal of a first wavelength, and the second antenna radiator is able to radiate a wireless signal of a second wavelength which is half of the first wavelength.

20 Claims, 8 Drawing Sheets

(56) References Cited

U.S. PATENT DOCUMENTS

| | | | | |
|---|---|---|---|---|
| 2015/0171508 A1* | 6/2015 | Jeon | H01Q 5/307 343/702 |
| 2020/0161775 A1* | 5/2020 | Zhu | H01Q 21/28 |

FOREIGN PATENT DOCUMENTS

| | | | |
|---|---|---|---|
| CN | 109167153 | A | 1/2019 |
| CN | 208706860 | U | 4/2019 |
| CN | 110034374 | A | 7/2019 |
| CN | 209709165 | U | 11/2019 |
| CN | 110676557 | A | 1/2020 |
| KR | 20130134658 | A | 12/2013 |

OTHER PUBLICATIONS

First Office Action Dated Aug. 27, 2020 issued in corresponding China Application No. 201910900516.4, 17 pages.
Second Office Action Dated Apr. 26, 2021 issued in corresponding China Application No. 201910900516.4, 9 pages.
Notice of Allowance Dated Aug. 5, 2021 issued in corresponding China Application No. 201910900516.4, 6 pages.
Supplementary European Search Report dated Oct. 17, 2022 From the European Patent Application No. 20867453.1.

* cited by examiner

ELECTRONIC DEVICE AND METHOD FOR FABRICATING ANTENNA RADIATOR

CROSS REFERENCE TO RELATED APPLICATIONS

This application is a continuation of International Application No. PCT/CN2020/115353, filed Sep. 15, 2020, which claims priority of Chinese Patent Application No. 201910900516.4 filed on Sep. 23, 2019, entitled "Electronic device and method for fabricating antenna radiator", the entire contents of which are incorporated herein by reference in their entireties.

BACKGROUND

The present disclosure relates to the field of electronic technology, and more particular, to an electronic device and a method for fabricating an antenna radiator.

With developments of electronic technology, functions of electronic devices such as smart phones are becoming more and more abundant, and their appearance is gradually becoming thinner and lighter. In order to pursue high-quality appearance and touch, metal casings are widely used.

SUMMARY

Embodiments of the present application provide an electronic device and a method for fabricating an antenna radiator. The electronic device can improve a radiation bandwidth and an efficiency of the antenna without increasing a thickness, the method for fabricating the antenna radiator is simple, and the antenna radiator has less requirements on a material of a substrate.

A first aspect of the present disclosure provides an electronic device including a circuit board, a support, a first antenna radiator, a back cover, and a second antenna radiator.

The circuit board includes a signal source, the support is located on a side of the circuit board and the support supports the circuit board, the first antenna radiator is located on the support, the first antenna radiator is electrically connected to the signal source, and the first antenna radiator is configured to radiate a wireless signal of a first wavelength, the back cover is located on a side of the support away from the circuit board, and the second antenna radiator is located on the side of the back cover facing the first antenna radiator, the second antenna radiator and the first antenna radiator are electrically connected through electromagnetic coupling. When the first antenna radiator radiates a wireless signal of the first wavelength, the second antenna radiator is configured to generate and radiate a wireless signal of the second wavelength through resonance, and the second wavelength is half of the first wavelength.

A second aspect of the present disclosure provides a method for fabricating an antenna radiator, which is used to fabricating the second antenna radiator of the electronic device.

The method for fabricating the antenna radiator includes using the back cover of the electronic device as a substrate and selecting a target area on the substrate; spraying a silver paste material in the target area and forming a silver paste coating; and performing plasma laser on the silver paste coating to form the second antenna radiator.

BRIEF DESCRIPTION OF THE DRAWINGS

In order to more clearly illustrate the embodiments of the present application or the technical solutions in the related art, the drawings to be used in the descriptions of the embodiments or the related art will be briefly introduced below. Obviously, the drawings described below only illustrate some embodiments of the present application, and other drawings can be obtained according to these drawings without any creative effort for those skilled in the art.

DETAILED DESCRIPTION OF THE ILLUSTRATED EMBODIMENTS

Embodiments of the present disclosure are described in detail below. Embodiments described below are exemplary, and are only used to explain the present disclosure, and should not be construed as limiting the present disclosure. Where specific techniques or conditions are not indicated in the examples, the procedures shall be carried out in accordance with the techniques or conditions described in the literature in the field or in accordance with the product specification.

An embodiment of the present application provides an electronic device 100. The electronic device 100 can be a smart phone, a tablet computer, etc., and can also be a game device, an augmented reality (AR) device, a car device, a data storage device, an audio playback device, a video playback device, a notebook computer, a desktop computing device, etc.

Figure 1:
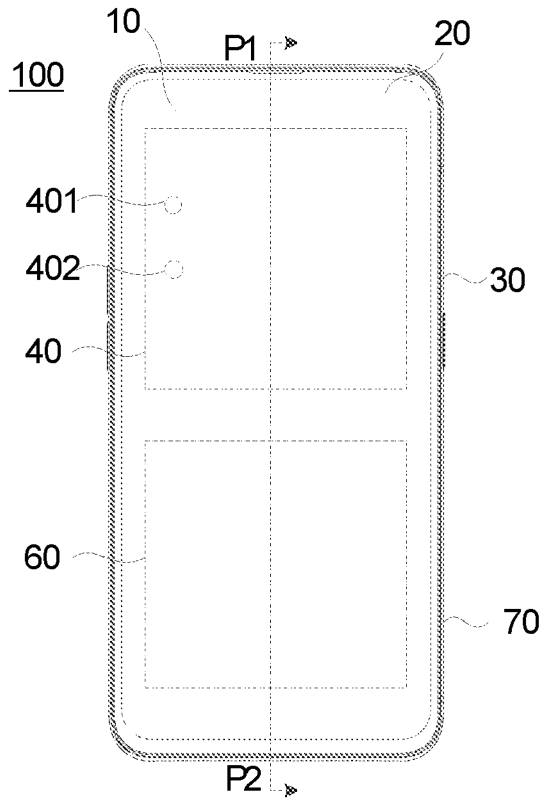
FIG. 1 is a structural schematic diagram of an electronic device provided by an embodiment of the application.
Figure 2:
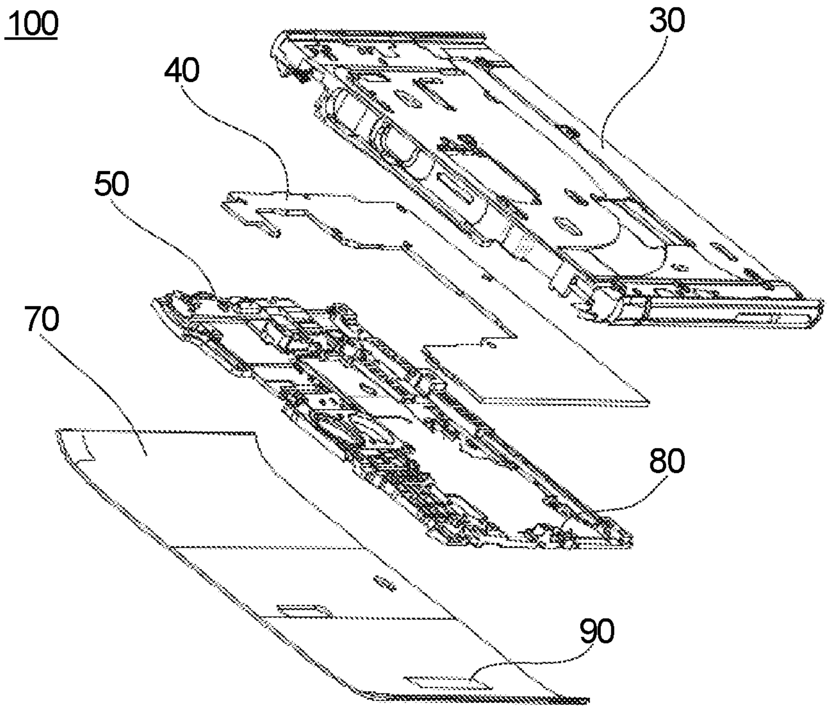
FIG. 2 is an exploded view of the electronic device shown in FIG. 1.
Figure 3:
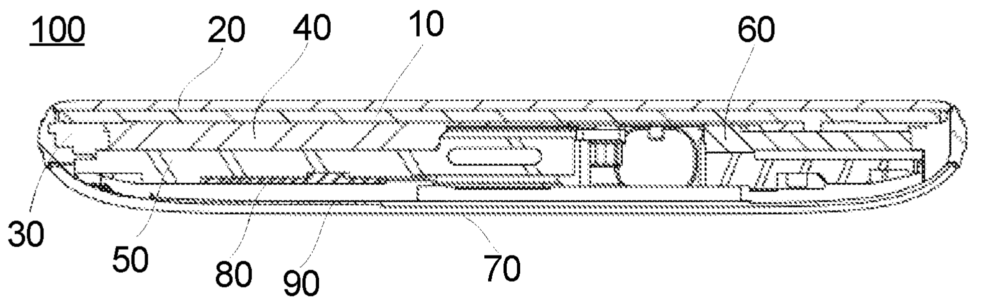
FIG. 3 is a cross-sectional view of the electronic device in FIG. 1 along a direction P1-P2.
Figure 4:
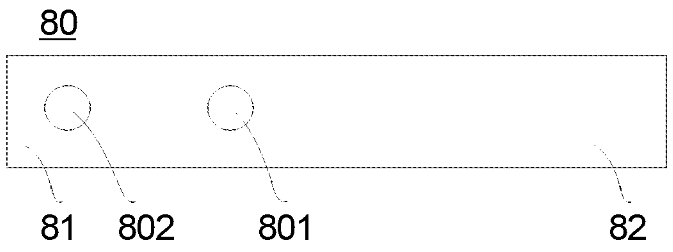
FIG. 4 is a structural schematic diagram of a first antenna radiator shown in FIG. 3.

Referring to FIG. 1 to FIG. 4, FIG. 1 is a structural schematic diagram of an electronic device provided by an embodiment of this application, FIG. 2 is an exploded view of the electronic device shown in FIG. 1, and FIG. 3 is the electronic device in FIG. 1 along a direction P1-P2, and FIG. 4 is a structural schematic diagram of a first antenna radiator shown in FIG. 3. The electronic device 100 includes a display screen 10, a cover 20, a middle frame 30, a circuit board 40, a support 50, a battery 60, a back cover 70, a first antenna radiator 80 and a second antenna radiator 90.

The display screen 10 can be used to display information such as images and texts. The display screen 10 can be a liquid crystal display (LCD) or an organic light-emitting diode display (OLED).

Herein, the display screen 10 can be installed on the middle frame 30 and connected to the back cover 70 through the middle frame 30 to form a display surface of the electronic device 100. The display screen 10 serves as a front casing of the electronic device 100, and forms a housing of the electronic device 100 together with the back cover 70, which is configured to accommodate other electronic elements of the electronic device 100.

For example, the housing may be configured to accommodate electronic elements such as a processor, a memory, one or more sensors, and a camera module of the electronic device 100.

The display screen 10 may include a display area and a non-display area. Herein, the display area performs a display function of the display screen 10 and is configured to display information such as images and texts. No information is displayed in the non-display area. The non-display area can be configured to set up electronic elements such as camera modules and touch electrodes of the display screen.

The display screen 10 may be a full screen. At this time, the display screen 10 can display information in a full screen, so that the electronic device 100 has a larger screen-to-body ratio. The display screen 10 only includes a display area and does not include a non-display area, or an area of the non-display area is relatively small for the user. At this time, electronic elements such as cameras and proximity sensors in the electronic device 100 can be hidden under the display screen 10, and the fingerprint recognition module of the electronic device 100 can be arranged on the back cover 70 of the electronic device 100.

The cover 20 may be installed on the middle frame 30, and the cover 20 covers the display screen 10 to protect the display screen 10 from being scratched or damaged by water. Herein, the cover 20 may be a transparent glass cover, so that a user can observe contents displayed on the display screen 10 through the cover 20. The cover 20 may be a glass cover made of sapphire.

The middle frame 30 may have a thin plate or sheet-like structure, or a hollow frame structure. The middle frame 30 is configured to provide a supporting function for the electronic device or the electronic elements in the electronic device 100 so as to install the electronic device and the electronic elements in the electronic device 100 together.

For example, electronic elements such as a camera, a receiver, a circuit board 40, and a battery 60 of the electronic device 100 can all be mounted on the middle frame 30 for fixing.

The circuit board 40 may be installed on the middle frame 30. The circuit board 40 may be the main board of the electronic device 100. The circuit board 40 may include a signal source 401 and a grounding point 402. The grounding point 402 may achieve grounding of the circuit board 40. The signal source 401 may be electrically connected to a feeding terminal of the antenna radiator so that the antenna radiator can radiate wireless signals. The circuit board 40 can be integrated with one, two or more electronic elements such as a microphone, a speaker, a receiver, a headphone interface, a universal serial bus interface (USB interface), a camera assembly, a distance sensor, an ambient light sensor, a gyroscope, and a processor. At the same time, the display screen 10 may be electrically connected to the circuit board 40.

Herein, the circuit board 40 is provided with a display control circuit. The display control circuit outputs electrical signals to the display screen 10 to control the display screen 10 to display information.

The support 50 is located between the circuit board 40 and the middle frame 30. That is, the support 50 is located on a side of the circuit board 40 away from the display screen 10. The support 50 covers the circuit board 40, so the circuit board 40 is protected when the circuit board 40 is installed on the middle frame 30.

The support 50 may be made of materials with insulating properties, such as insulating plastic, insulating ceramics, insulating glass, etc., to avoid interferences with electronic elements on the circuit board 40.

The battery 60 may be installed on the middle frame 30. At the same time, the battery 60 is electrically connected to the circuit board 40 so that the battery 60 can supply power to the electronic device 100. Herein, the circuit board 40 may be provided with a power management circuit. The power management circuit is configured to distribute a voltage provided by the battery 60 to various electronic elements in the electronic device 100.

Herein, the battery 60 may be a rechargeable battery. For example, the battery 60 may be a lithium-ion battery.

The back cover 70 is located on a side of the support 50 away from the circuit board 40. That is, the back cover 70 is located at an outermost portion of the electronic device 100 and is configured to form an outer contour of the electronic device 100. The back cover 70 may be integrally formed. During a formation process of the back cover 70, a rear camera hole, a fingerprint recognition module mounting hole, and other structures may be formed on the back cover 70.

The back cover 70 may be a metal shell, such as magnesium alloy, stainless steel and other metals. It should be noted that the material of the back cover 70 in the embodiment of the present application is not limited thereto, and other materials may also be used.

For example, the back cover 70 may be a plastic shell. For example, the back cover 70 may be a ceramic case.

For example, the back cover 70 may include a plastic portion and a metal portion, and the back cover 70 may be a shell structure in which cooperates metal with plastic. Specifically, the metal portion may be formed by, for example, first forming a magnesium alloy substrate by injection molding, and then injecting plastic on the magnesium alloy substrate to form a plastic substrate, thereby forming a complete shell structure.

The first antenna radiator 80 may be located on the support 50.

In addition, the first antenna radiator 80 may be provided with a feeding terminal 801 and a ground terminal 802, and the ground terminal 802 is electrically connected to the ground point 402 on the circuit board 40 to form a ground connection of the first antenna radiator 80. Specifically, the ground terminal 802 may be connected to the ground point 402 on the circuit board 40 through a ground wire, a ground spring sheet, or the like.

The feeding terminal 801 of the first antenna radiator 80 is electrically connected to the signal source 401 on the circuit board 40, so that the first antenna radiator 80 is electrically connected with a radio frequency circuit on the circuit board 40, thereby realizing functions of receiving and sending radio frequency signals of the first radiator 80 to radiate wireless signals of a first wavelength to an outside of the electronic device 100.

The first wavelength can be adjusted according to the frequency of the radio frequency circuit, so that the first antenna radiator 80 can radiate a wavelength that meets the communication requirements. The feeding terminal 801 of the first antenna radiator 80 may be connected to the signal source 401 on the circuit board 40 through a feeding point spring sheet, a feeding wire, and the like.

For example, one end of the feeding point spring sheet is connected to the feeding terminal 801 of the first antenna radiator 80, and the other end of the feeding point spring sheet is connected to the signal source 401 of the circuit board 40. The feeding point spring sheet is configured to connect the first antenna radiator 80 and the circuit board 40, and the elastic deformation performance of the feed point shrapnel can be configured to make the first antenna radiator 80 and the circuit board 40 difficult to separate and ensure the electrical properties between connections thereof.

Herein, the first antenna radiator 80 may have a sheet structure. That is, a thickness of the first antenna radiator 80 may be very thin.

For example, the first antenna radiator 80 may be a flat panel structure, and the feeding terminal 801 and the ground terminal 802 are located on the surface of the first antenna radiator 80 of the flat panel structure.

Specifically, the feeding terminal 801 and the ground terminal 802 may be located on a surface of the first antenna radiator 80 facing the circuit board 40, and the signal source 401 and the ground point 402 on the circuit board 40 may be connected with the feeding terminal 801 and the ground terminal 802 respectively through the through holes defined on the support 50.

The feeding terminal 801 and the grounding end 802 can also be located on the surface of the first antenna radiator 80 facing the back cover 70, and the signal source 401 and the grounding point 402 on the circuit board 40 may be electrically connected to the feeding terminal 801 and the grounding end 802 respectively through the through holes defined on the support 50 and the grooves defined on the first antenna radiator 80.

Herein, the first antenna radiator 80 may include a first end 81 and a second end 82, the ground terminal 802 may be located at the first end 81 of the first antenna radiator 80, and the feed end 801 may be located between the first end 81 and the second end 82 of the body of the first antenna radiator 80.

In the electronic device 100 of the embodiment of the present application, when the feeding terminal 801 of the first antenna radiator 80 is electrically connected to the signal source 401 of the circuit board 40 and forms a current loop, the current loop is able to form an oscillating electric field formed between the first end 81 and the second end 82 of the body of the first antenna radiator 80.

When the second antenna radiator 90 covers the first end 81 and the second end 82 of the first antenna radiator 80, the second antenna radiator 90 is strongly affected by the oscillating electric field, so that the electromagnetic coupling between the first antenna radiator 80 and the second antenna radiator 90 is stronger.

It can be understood that a first distance between the feeding terminal 801 and the first end 81 of the first antenna radiator 80 may be equal to a second distance between the feeding terminal 801 and the second end 82 of the first antenna radiator 80. At this time, the feeding terminal 801 of the first antenna radiator 80 is electrically connected to the signal source 401 of the circuit board 40 and forms a current loop, which can be concentrated in the middle of the first end 81 and the second end 82, and a current density near the middle position is stronger. Therefore, when the second antenna radiator 90 covers the first antenna radiator 80, the second antenna radiator 90 is more strongly affected by the oscillating electric field, and a coupling strength of electromagnetic waves between the first antenna radiator 80 and the second antenna radiator 90 is stronger.

For example, a surface of the first antenna radiator 80 may include two oppositely arranged long sides and two oppositely arranged short sides, any one of the long sides is connected to the two short sides, and then the two long sides and the two short sides form a rectangular structure. The first end 81 may be one of the long sides, the second end 82 may be the other one of the long sides, and the feeding terminal 801 may be located between the two long sides. The first end 81 can also be one of the short sides, the second end 82 can also be the other one of the short sides, and the feeding terminal 801 can be located between the two short sides.

It is understandable that the feeding terminal 801 may be located at a center point of a surface of the first antenna radiator 80. That is, the distance between the feeding terminal 801 and the two long sides of the first antenna radiator 80 at this time is equal, and the distance between the input end 801 and the two short sides of the first antenna radiator 80 is also equal.

When the feeding terminal 801 of the first antenna radiator 80 is electrically connected to the signal source 401 of the circuit board 40 and forms a current loop, the current loop can form an electric field that is centered symmetrically along the center point, and the current is further concentrated near the center point. The first antenna radiator 80 can further uniformly radiate wireless signals outward, and the strength of the electromagnetic coupling between the first antenna radiator 80 and the second antenna radiator 90 covering the first antenna radiator 80 is stronger.

Herein, the second antenna radiator 90 may be located on an inner surface of the back cover 70. The inner surface is a side surface of the back cover 70 facing the first antenna radiator 80. That is, the inner surface refers to a side that is invisible to the back cover 70 when viewed from the outside of the electronic device 100. The second antenna radiator 90 is spaced apart from the first antenna radiator 80 and the circuit board 40.

The second antenna radiator 90 and the first antenna radiator 80 are electrically connected through electromagnetic coupling. A process of the second antenna radiator 90 and the first antenna radiator 80 radiating wireless signals to the outside of the electronic device 100 includes when the first antenna radiator 80 is electrically connected to the radio frequency circuit on the circuit board 40, and the first antenna radiator 80 radiates wireless signals of the first wavelength outward. The wireless signals of the first wavelength cause resonance between the first antenna radiator 80 and the second antenna radiator 90, and enables the second antenna radiator 90 to radiate wireless signals of the wavelength of the second wavelength, and the second wavelength is half of the first wavelength. Therefore, through the radiation cooperation of the first antenna radiator 80, the second antenna radiator 90 can generate a ½λ resonance.

In addition to the process of receiving the wireless signal transmitted by the base station of the second antenna radiator 90 and the first antenna radiator 80, the second antenna radiator 90 receives wireless signals of the third wavelength transmitted by the base station, and the wireless signal causes resonances generated between the first antenna radiator 80 and the second antenna radiator 90. The first antenna radiator 80 receives the wireless signal of the fourth wavelength, and the radio frequency signal circuit electrically connected to the first antenna radiator 80 converts the wireless signal of the fourth wavelength into electrical signals that are transmitted in the electronic device 100.

In the electronic device 100 provided by the embodiment of the present application, the second antenna radiator 90 is arranged on the back cover 70, the first antenna radiator 80 is arranged on the support 50, and the first antenna radiator 80 and the second antenna radiator 90 fully utilize a clearance space between the back cover 70 and the support 50 to increase an overall height of the antenna formed by the first antenna radiator 80 and the second antenna radiator 90, which improves the overall radiation efficiency of the antenna. In the case of the same antenna radiation efficiency, compared to the solution where only one antenna radiator is provided on the support 50, the electronic device 100 of the embodiment of the present application is additionally provided with a second antenna radiator 90 on the back cover 70. The distance between the first antenna radiator 80 and the ground point can be reduced, thereby reducing the installation height requirement of the first antenna radiator 80, and more effectively utilize the internal space of the electronic device 100 to lay out the first antenna radiator 80 and the second antenna radiator 90 without increasing the thickness of the electronic device 100, which facilitates the realization of the portable and thin design of the electronic device 100.

Moreover, in the electronic device 100 provided by the embodiment of the present application, through the radiation cooperation of the first antenna radiator 80, the second antenna radiator 90 can generate ½λ resonance, which broadens an overall broadband formed radiation of the first antenna radiator 80 and the second antenna body 90, and further improves the radiation efficiency of the entire electronic device 100. In the case of the same antenna radiation efficiency, compared to the solution where only one antenna radiator is provided on the support 50, the electronic device 100 of the embodiment of the present application is additionally provided with a second antenna radiator 90 on the back cover 70, a wiring area requirement of the first antenna radiator 80 can be reduced by ⅓, and the installation difficulty of the first antenna radiator 80 can be further reduced.

Figure 5:
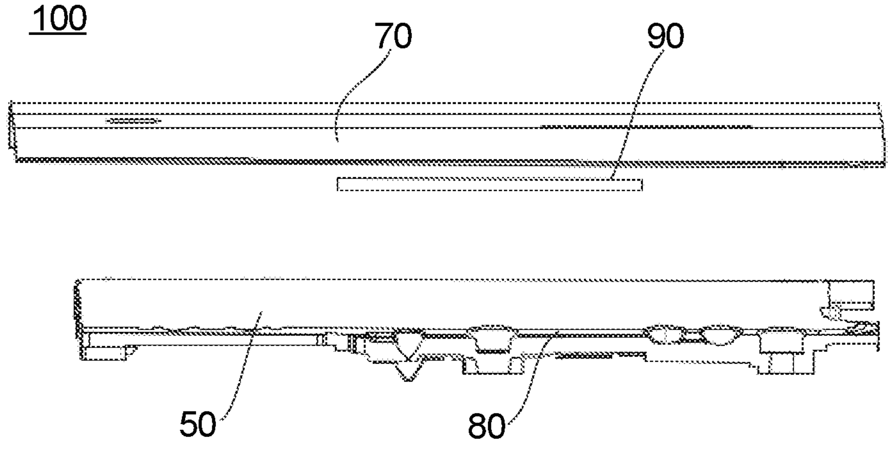
FIG. 5 is a structural schematic diagram of a back cover, a second antenna radiator and a support shown in FIG. 1.
Figure 6:
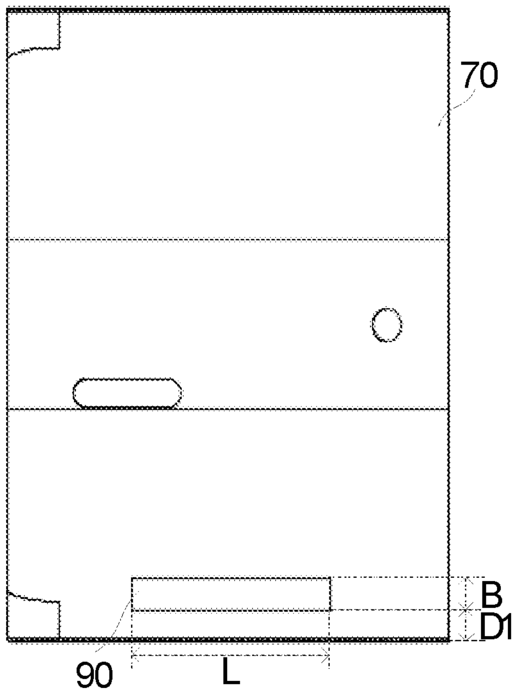
FIG. 6 is a schematic diagram of a first structure of the back cover and the second antenna radiator shown in FIG. 5.
Figure 7:
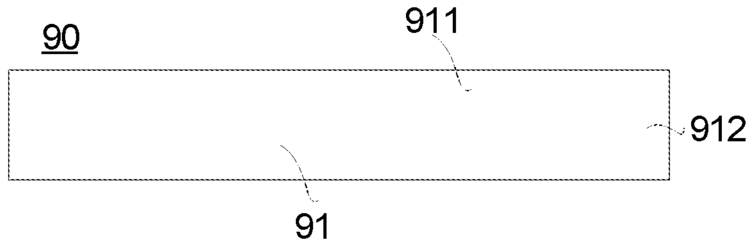
FIG. 7 is a structural schematic diagram of the second antenna radiator shown in FIG. 6.

Herein, the second antenna radiator 90 may have any shape, for example, a rectangle, a square, a circle, a triangle, and so on. Referring to FIGS. 5-7, FIG. 5 is a structural schematic diagram of the back cover, the second antenna radiator and the support shown in FIG. 1, and FIG. 6 is a schematic diagram of a first structure of the back cover and the second antenna radiator shown in FIG. 5, and FIG. 7 is a schematic structural diagram of the second antenna radiator shown in FIG. 6.

Herein, the second antenna radiator 90 has a sheet structure. That is, a thickness of the second antenna radiator 90 is relatively thin. The sheet-shaped second antenna radiator 90 may include a rectangular portion 91. That is, at least a portion of the second antenna radiator 90 may have a rectangular structure. When the second antenna radiator 90 has a rectangular structure as a whole, the fabrication steps of the second antenna radiator 90 can be simplified on one hand, and the radio frequency performance of the second antenna radiator 90 is better and stable on the other hand, In addition, the rectangular portion 91 may include a first side 911 and a second side 912. Herein a length of the first side 911 may be much greater than a length of the second side 912, so that an edge effect between the second radiator 90 and the first antenna radiator 80 is small. Specifically, an aspect ratio of the first side 911 and the second side 912 of the rectangular structure may be L:B=5:1. When the aspect ratio of the second antenna radiator 90 is 5:1, the length of the second antenna radiator 90 is much larger than its width, and the edge effect between the second antenna radiator 90 and the first antenna radiator 80 is small, so that the second antenna radiator 90 is less affected by the edge effect, and the radio frequency performance of the second antenna radiator 90 is more stable.

For example, the length L of the second antenna radiator 90 may be 20.5 mm, the width B of the second antenna radiator 90 may be 4.1 mm, and an area of the second antenna radiator 90 is relatively large. On the one hand, a resistance value of the second antenna radiator 90 is within a reasonable range, and on the other hand, the edge effect between the second antenna radiator 90 and the first antenna radiator 80 is small, and the radio frequency performance of the second antenna radiator 90 is better.

Figure 8:
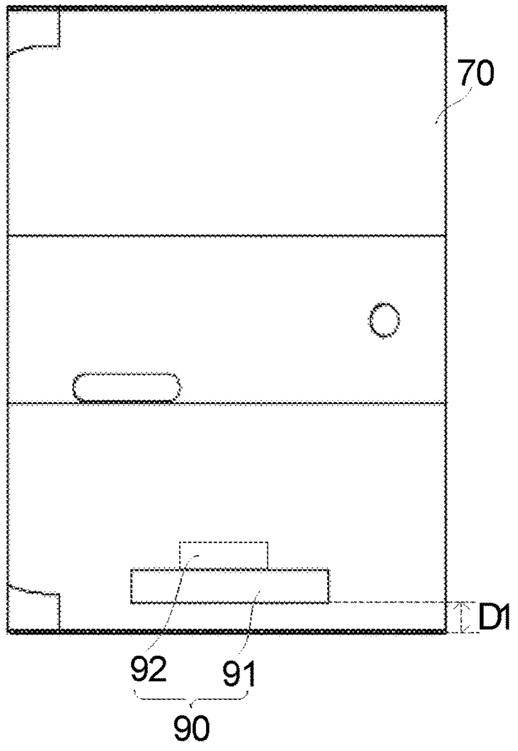
FIG. 8 is a schematic diagram of the back cover and a second structure of the second antenna radiator shown in FIG. 5.

Referring to FIG. 8, FIG. 8 is a schematic diagram of a second structure of the back cover and the second antenna radiator shown in FIG. 5. Herein, the second antenna radiator 90 may also include a rectangular portion 91 and a protruding portion 92, and the rectangular portion 91 and the protruding portion 92 are integrally formed. The shape of the protrusion portion 92 may also be any shape, such as a triangle, a rectangle, a trapezoid, a fan shape, and the like. Herein, the shape of the protrusion portion 92 is also preferably rectangular. On the one hand, the fabrication steps of the protrusion portion 92 of the second antenna radiator 90 can be simplified, and on the other hand, the radio frequency performance of the second antenna radiator 90 is better and more stable.

The protruding portion 92 may be located on the short side of the rectangular portion 91, and the second antenna radiator 90 may form an antenna radiator with a T-shaped structure or an antenna radiator with an L-shaped structure. The protruding portion 92 can also be located on the long side of the rectangular portion 91, and the second antenna radiator 90 can form an antenna radiator with a convex structure. When the long side of the rectangular portion 91 is parallel to the edge of the middle frame 30, the protruding portion 92 is also arranged parallel to the edge of the middle frame 30, so that the protruding portion 92 is conveniently located above the first antenna radiator 80.

Herein, the protruding portion 92 of the second antenna radiator 90 may be located directly below the first antenna radiator 80. That is, an orthographic projection of the protruding portion 92 on the support 50 may be the same as an orthographic projection of the first antenna radiator 80 on the support 50. When the first antenna radiator 80 is connected to the radio frequency circuit on the circuit board 40, the wireless signal radiated from the first antenna radiator 80 can be transmitted between the first antenna radiator 80 and the second antenna radiator 80. The second antenna radiator 90 has a closer communication connection with the first antenna radiator 80, and the radio frequency performance of the second antenna radiator 90 is better.

Figure 9:
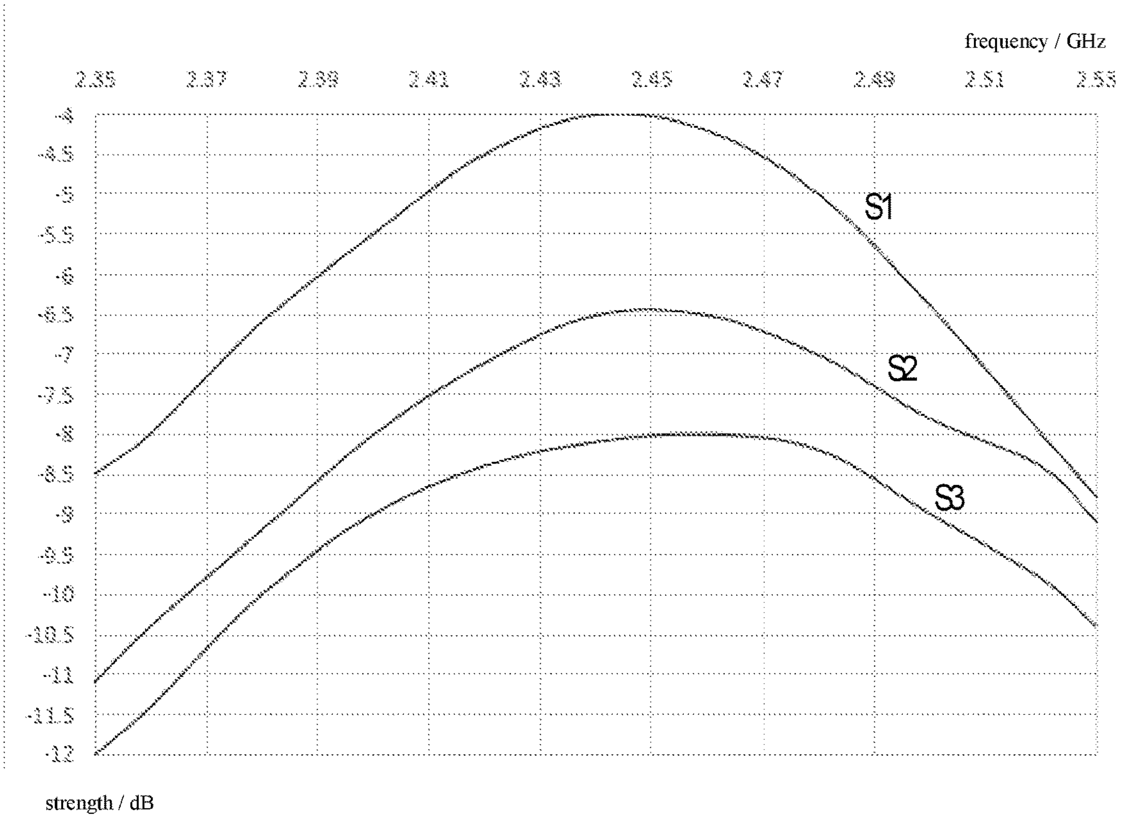
FIG. 9 is a comparison diagram of a radiation efficiency of the second antenna radiator in FIG. 6 and FIG. 8.

The second antenna radiator 90 of the embodiment of the present application includes a rectangular portion 91 and a protruding portion 92. Compared with an antenna radiator that only includes the rectangular portion 91, the antenna system efficiency thereof is higher. As shown in FIG. 9, FIG. 9 is a comparison diagram of a radiation efficiency of the second antenna radiator in FIG. 6 and FIG. 8.

Herein, the curve S1 is a graph of an overall antenna system efficiency of the second antenna radiator 90 including the protruding portion 92 and the rectangular portion 91 and the first antenna radiator 80, and the curve S2 is a graph of an overall antenna system efficiency of the second antenna radiator 90 only including the rectangular portion 91 and the first antenna radiator 80, and the curve S3 is an antenna system efficiency of the first antenna radiator 80. When comparing curves 1 to 3, at 2.44 GHz, the antenna system efficiency of curve 1 is −4 dB, the antenna system efficiency of curve 2 is −6.5 dB, and the antenna system efficiency of curve 3 is −8. It can be seen that the efficiency of the antenna system is increased by 1.5 dB after the second antenna radiator is set. After the protrusion portion 92 is provided on the second antenna radiator 90, the overall antenna system efficiency of the second antenna radiator 90 and the first antenna radiator 80 is increased by 2.5 dB.

Figure 10:
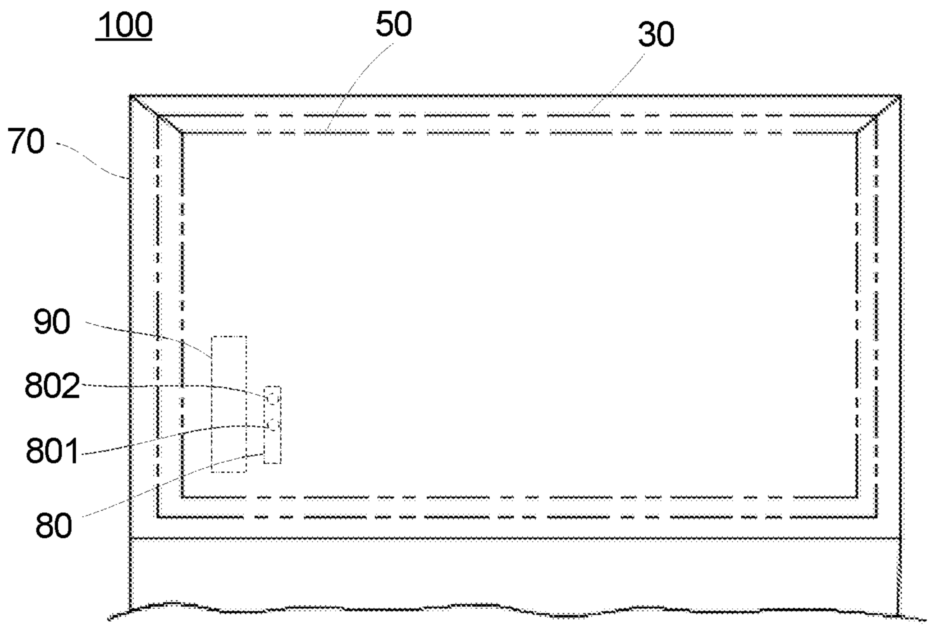
FIG. 10 is a schematic diagram of a first combination of the back cover, a middle frame and the support shown in FIG. 5.
Figure 11:
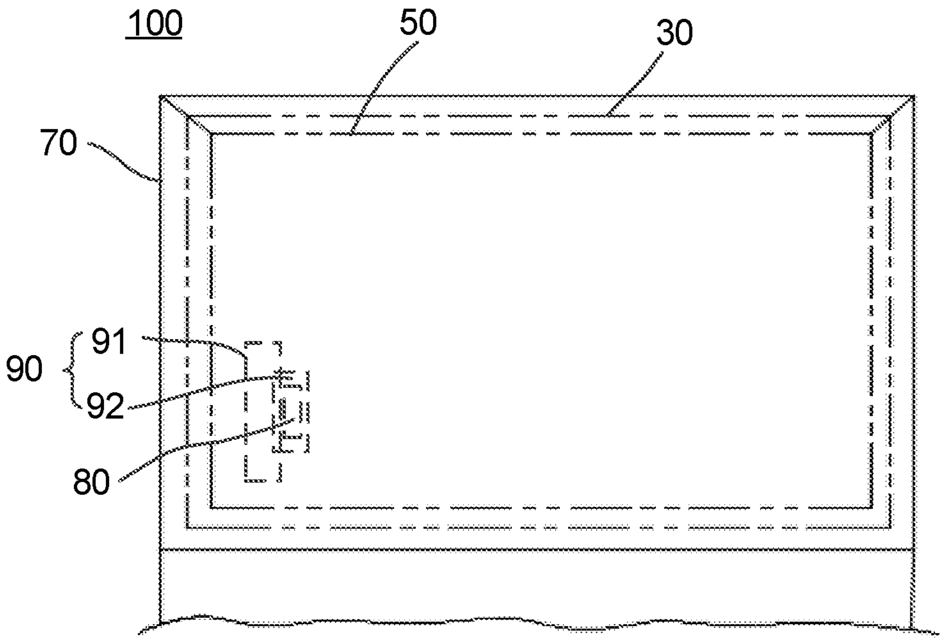
FIG. 11 is a schematic diagram of a second combination of the back cover, a middle frame and the support shown in FIG. 5.

Referring to FIG. 10 and FIG. 11, FIG. 10 is a schematic diagram of a first combination of the back cover, the middle frame and the support shown in FIG. 5, and FIG. 11 is a schematic diagram of a second combination of the back cover, the middle frame and the support shown in FIG. 5. The middle frame 30 may be located on a side of the back cover 70 facing the support 50, the middle frame 30 is located between the support 50 and the back cover 70, and the circuit board 40 and the support 50 are installed on the middle frame 30 together. The middle frame 30 may be a ceramic middle frame, a metal middle frame, or a plastic middle frame.

When the middle frame 30 is a metal middle frame, the second antenna radiator 90 is spaced apart from the edge of the metal middle frame. The edge of the metal middle frame refers to the outermost structure of the metal middle frame.

For example, when the metal middle frame is rectangular, the edges can be the upper and lower sides of the metal middle frame, or the left and right sides of the metal middle frame. The space apart refers to the portion where the projection of the second antenna radiator 90 on the metal middle frame does not overlap with the edge of the metal middle frame, and there is a gap between the second antenna radiator 90 and the edge of the metal middle frame. When the second antenna radiator 90 is operating, the signal emitted outward is not easily reflected by the edge of the metal middle frame, the signal received inward is not easily absorbed by the metal middle frame, and the second antenna radiator 90 is less affected by the metal middle frame.

Figure 12:
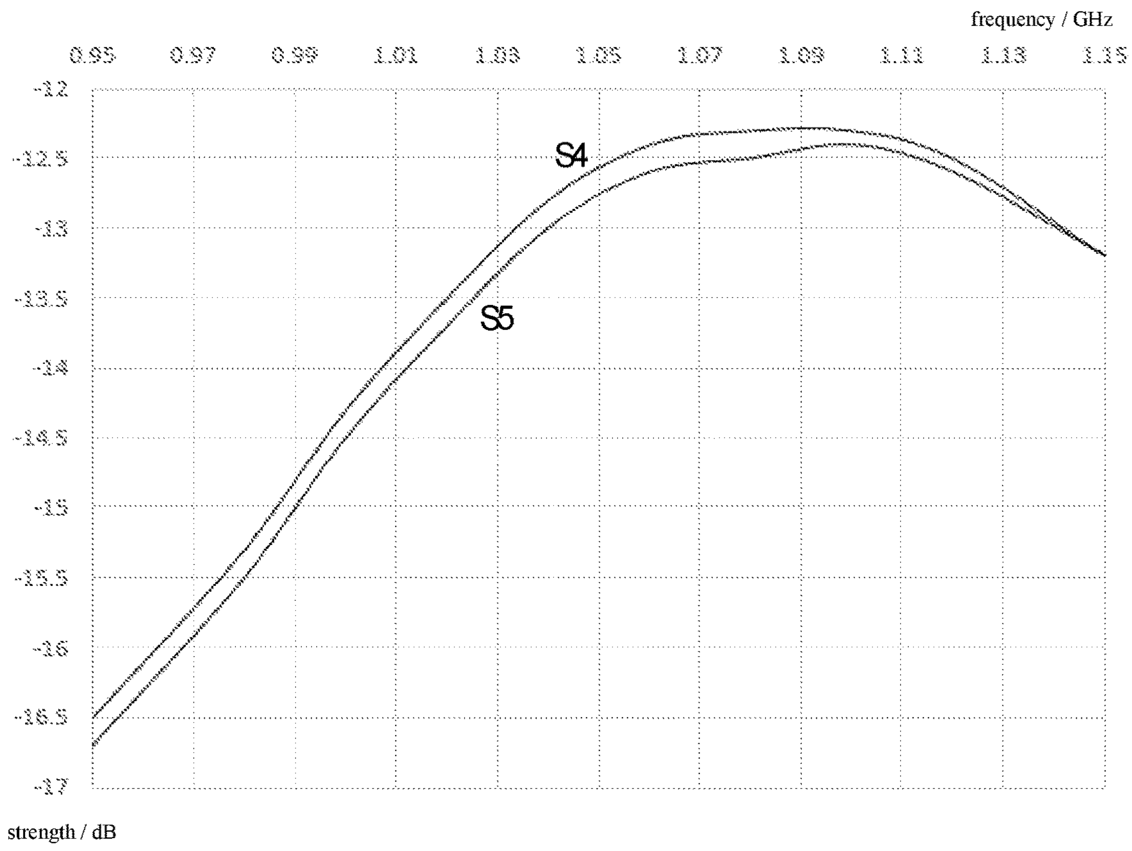
FIG. 12 is a comparison diagram of a radiation efficiency of the first antenna radiator, the second antenna radiator and a middle-frame antenna radiator shown in FIG. 8.

The metal middle frame is equivalent to a middle frame antenna radiator, and the second antenna radiator 90 will not affect the efficiency of the middle frame antenna radiator made by the edge of the metal middle frame when the distance between the second antenna radiator 90 and the edge of the metal middle frame is 5 mm. As shown in FIG. 12, FIG. 12 is a comparison diagram of a radiation efficiency of the first antenna radiator, the second antenna radiator, and the middle-frame antenna radiator shown in FIG. 8.

As shown in FIG. 12, the curve S4 is a graph of an antenna efficiency curve of the middle frame antenna radiator formed by the edge of the metal middle frame when the distance between the second antenna radiator 90 and the edge of the metal middle frame is 5 mm, and the curve S5 is a graph of the antenna efficiency of the middle frame antenna radiator formed by the edge of the metal middle frame without the second antenna radiator 90. Comparing the curve S4 and the curve S5, when the distance between the second antenna radiator 90 and the edge of the metal middle frame is 5 mm, the radiation efficiency of the middle frame antenna radiator changes in the range of 0.2 dB. It can be seen that at this time, the second antenna body 90 basically has no effect on the efficiency of the metal third antenna radiator.

Figure 13:
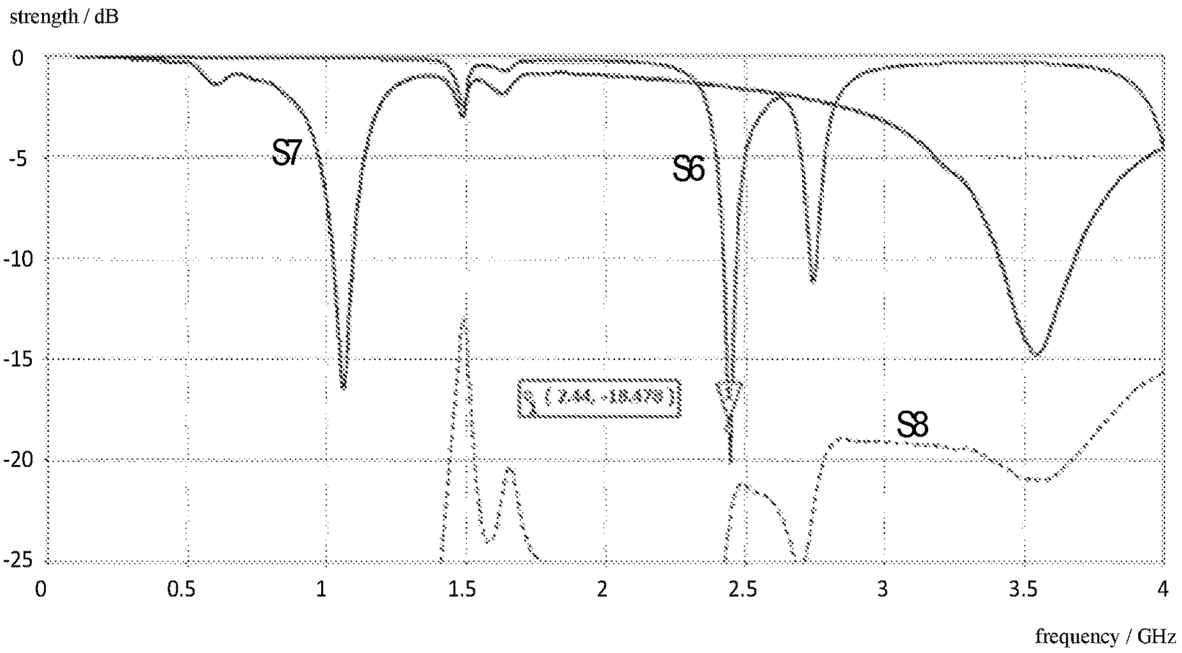
FIG. 13 is a S12 parameter diagram of the first antenna radiator, the second antenna radiator and the middle frame antenna radiator shown in FIG. 8.

Referring to FIG. 13, FIG. 13 is a S12 parameter diagram of the first antenna radiator, the second antenna radiator, and the middle frame antenna radiator shown in FIG. 8. When the distance between the second antenna radiator 90 and the edge of the metal middle frame is 5 mm, at this time, the middle frame antenna radiator formed by the edge of the metal middle frame will not affect the overall efficiency of the antenna formed by the second antenna radiator 90 and the first antenna radiator 80.

The S-parameter can be used to evaluate the performance of antenna reflected signals and transmitted signals. The S-parameter is usually expressed as: S output and S input. As shown in FIG. 13, S12 refers to a ratio of the output signal of a port on the first antenna radiator 80 and the second antenna radiator 90 to the input signal between the port on the middle frame antenna radiator. Herein, in the S12 parameter diagram in FIG. 13, the edge of the metal middle frame is designed as a middle frame antenna radiator, that is, the edge of the metal middle frame is equivalent to the middle frame antenna radiator in FIG. 12.

In the S12 parameter diagram shown in FIG. 13, the curve S6 is the overall radiation curve of the first antenna radiator 80 and the second antenna radiator 90, the curve S7 is the radiation curve of the middle frame antenna radiator, and the curve S8 represents the radiation curve between the output signal of the port of the first antenna radiator 80 and the second antenna radiator 90 and the port on the middle frame antenna radiator. The curve 8 can reflect the isolation between the whole antenna of the second antenna radiator 90 and the first antenna radiator 80 and the middle frame antenna radiator. That is, the curve 8 can reflect the interference of the edge of the metal middle frame to the whole antenna of the second antenna radiator 90 and the first antenna radiator 80. The higher the peak of the curve 8, the smaller isolation is between the second antenna radiator 90 and the first antenna radiator 80 and the metal third antenna radiator. That is, the greater the interference is between the whole antenna of the second antenna radiator 90 and the first antenna radiator 80 and the metal middle frame. The smaller the peak value of the curve 8, the greater the isolation is between the second antenna radiator 90 and the first antenna radiator 80 and the metal third antenna radiator. That is, the interference is between the second antenna radiator 90, the first antenna radiator 80 and metal middle frame is smaller.

It can be seen from FIG. 13 that when the distance D1 between the second antenna radiator 90 and the edge of the metal middle frame is 5 mm, the isolation between the whole antenna of the first antenna radiator 80 and the second antenna radiator 90 and the middle frame antenna radiator is less than −10 db in the target frequency band 2.4-2.5 GHZ. The metal middle frame has a small interference effect on the whole antenna, and the overall radiation directivity, gain and impedance of the antenna are in a better state.

A Table 1 below is the radiation efficiency parameter table of the first antenna radiator, the second antenna radiator and the middle frame antenna radiator. It can also be seen from Table 1 that the average value of the overall system efficiency of the antenna composed of the first antenna radiator 80 and the second antenna radiator 90 in the embodiment of the present application is compared with that of the middle-frame antenna radiator composed of a metal middle frame. The average value of the system efficiency is increased by 1.25 dB. In the embodiment of the present application, the first antenna radiator 80 and the second antenna radiator 90 greatly improve the radiation efficiency of the entire electronic device 100.

TABLE 1

Radiation efficiency parameter table of the first antenna radiator, the second antenna radiator and the middle frame antenna radiator.

| | middle frame antenna radiator | | first antenna radiator and the second antenna radiator | |
|---|---|---|---|---|
| frequency/ MHZ | system efficiency/% | system efficiency/dB | system efficiency/% | system efficiency/dB |
| 2400 | 13 | −8.9 | 16 | −8.7 |
| 2420 | 15 | −8.4 | 20 | −7.1 |
| 2450 | 14 | −8.5 | 23 | −6.4 |
| 2480 | 15 | −8.2 | 20 | −7 |

Figure 14:
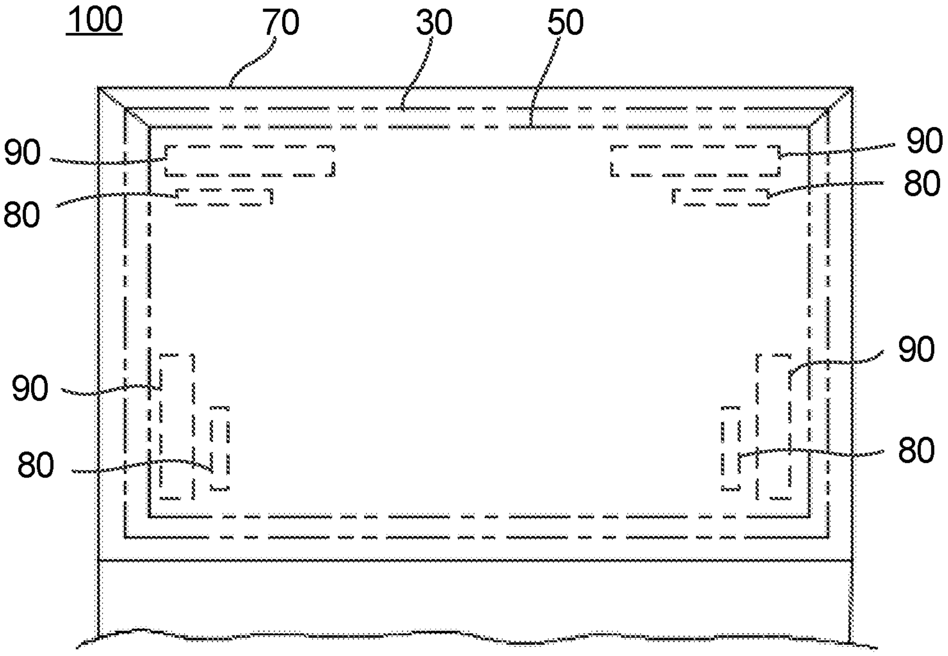
FIG. 14 is a schematic diagram of a third combination of the back cover, the middle frame and the support shown in FIG. 5.
Figure 15:
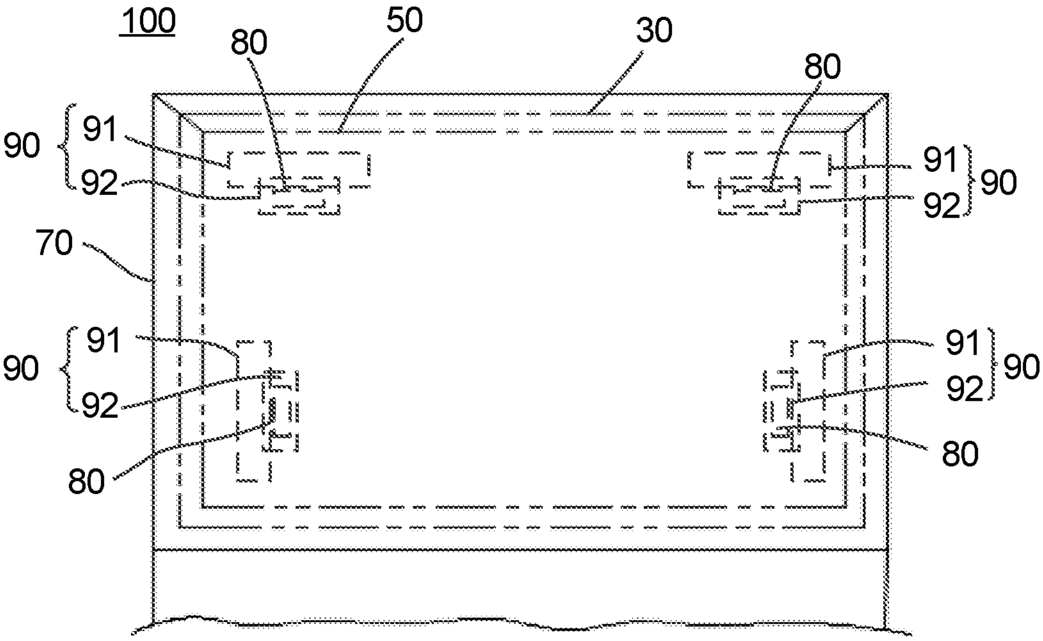
FIG. 15 is a schematic diagram of a fourth combination of the back cover, the middle frame and the support shown in FIG. 5.

Referring to FIG. 14 and FIG. 15, FIG. 14 is a schematic diagram of the third combination of the back cover, the middle frame and the support shown in FIG. 5, and FIG. 15 is a schematic diagram of the fourth combination of the back cover, the middle frame and the support shown in FIG. 5. The number of the first antenna radiator 80 may be multiple, and the number of the second antenna radiator 90 is equal to the number of the first antenna radiator 80. A first antenna radiator 80 and a second antenna radiator 90 form an antenna body. In a whole antenna, the first antenna radiator 80 and the second antenna radiator 90 are electrically connected through electromagnetic coupling. The first antenna body 80 radiates the wireless signal of the first wavelength, the second antenna radiator 90 radiates the wireless signal of the second wavelength. The second wavelength is half of the first wavelength. In an antenna as a whole, through cooperation of the first antenna radiator 80, the second antenna radiator 90 can generate ½λ resonance.

For example, the number of the first antenna radiator 80 and the second antenna radiator 90 are both four, the four first antenna radiators 80 are respectively located at the four corners of the support 50, and the four second antenna radiators 90 are located at the four corners of the back cover 70. When the first antenna radiator 80 in each corner radiates a wireless signal of the first wavelength to the outside of the electronic device 100, the second antenna radiator 90 located in the same corner correspondingly resonates and radiates the wireless signal of the second wavelength to the outside of the electronic device 100 at a wavelength of half of the first wavelength, so that with the cooperation of the first antenna radiator 80, the second antenna radiator 90 can generate a ½λ resonance. Moreover, arranging four first antenna radiators 80 and second antenna radiators 90 at the four corners of the support 50 and the back cover 70 can increase the distance between the multiple antenna radiators and reduce mutual interference between the multiple antenna radiators.

It can be understood that, in the entire antenna composed of a first antenna radiator 80 and a second antenna radiator 90, the first antenna radiator 80 and the second antenna radiator 90 respectively radiate wireless signals of different frequencies.

For example, the frequency of the wireless signal radiated by the second antenna radiator 90 may be higher than the frequency of the wireless signal radiated by the first antenna radiator 80.

Each antenna as a whole can radiate one or more of wireless signals in the middle, high, and low frequency bands of the cellular frequency band, wireless signals in the Wi-Fi frequency band, and wireless signals in the GPS frequency band. The multiple antennas as a whole can radiate wireless signals of different frequency bands to broaden the bandwidth of the entire electronic device 100. Multiple antennas can also have at least two groups of antennas radiating wireless signals of the same frequency band as a whole to form a multiple-input multiple-output (MIMO) antenna combination with a combination of high and high frequencies in the cellular frequency band, and a MIMO combination of high and low frequencies in the cellular frequency band, and antenna combination and MIMO antenna combination of Wi-Fi frequency band.

The electronic device 100 of the embodiment of the present application may further include a third antenna radiator and a fourth antenna radiator. The third antenna radiator may be arranged on the metal middle frame, and the fourth antenna radiator may be arranged on the circuit board 40. The number of the third antenna radiator may be multiple, and the number of the fourth antenna radiator may also be multiple. Furthermore, the third antenna radiator, the fourth antenna radiator, the first antenna radiator 80, and the second antenna radiator 90 of the embodiment of the present application are all on different horizontal planes, which can reduce the interference between the third antenna radiator, the fourth antenna radiator, the first antenna radiator 80 and the second antenna radiator 90.

In addition, the third antenna radiator and the fourth antenna radiator can also radiate one or more of a wireless signal in the middle, high, and low frequency bands of the cellular frequency band, a wireless signal in the Wi-Fi frequency band, and a wireless signal in the GPS frequency band. The wireless signals radiated by the overall antenna formed by the third antenna radiator, the fourth antenna radiator, and the first antenna radiator 80 and the second antenna radiator 90 may all be different to broaden the bandwidth of the entire electronic device 100. The wireless signals radiated the third antenna radiator, the fourth antenna radiator, and the overall antenna can have at least two groups of radiated wireless signals with the same frequency band to form a MIMO antenna combination with a high frequency combination in the cellular frequency band, a MIMO antenna combination with high and low frequencies in the cellular frequency band, and a MIMO combination of Wi-Fi frequency band.

It should be noted that the electronic device 100 may also include multiple entire antennas, multiple third antenna radiators, and multiple fourth antenna radiators at the same time, and the number of the entire antenna, the third antenna radiator, and the fourth radiator may vary according to the requirements of electronic device 100 to meet the actual communication requirements of the electronic device 100.

In the electronic device 100 of the embodiment of the present application, the first antenna radiator 80 may be formed by a 3D-MID process technology using a three-dimensional laser. For example, the first antenna radiator 80 may adopt a laser direct molding technology. First, the laser induces a modified material, and then a metal is selectively and directly plated and formed on the support 50. The first antenna radiator 80 does not need to occupy the internal space of the electronic device 100. Therefore, the thickness of the electronic device 100 will not be increased, and the thinner and lighter design of the electronic device 100 can be achieved.

It is understandable that the first antenna radiator 80 can also be located on the support 50 using other processes.

For example, the first antenna radiator 80 can be a laser induced common material using a laser activated technology, and then a metal is selectively plated to form the first antenna radiation body 80.

For example, the first antenna radiator 80 may adopt a patch antenna technology to achieve the connection between the first antenna radiator 80 and the support 50.

In the electronic device 100 of the embodiment of the present application, the second antenna radiator 90 may be formed by using laser direct molding technology, in which a laser-induced modified material is formed, and then a metal is plated. The second antenna radiator 90 can also be formed by a laser-activated metal plating technology, and a laser-induced common material is formed, and then a selective metal plating is performed.

Figure 16:
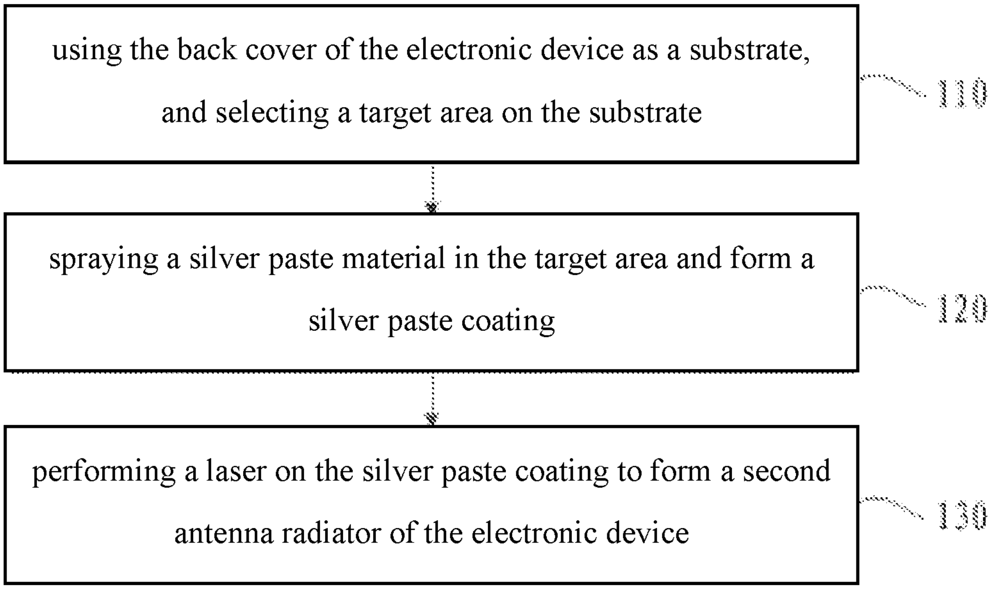
FIG. 16 is a schematic diagram of a first process of a method for fabricating an antenna radiator provided by an embodiment of the application.

The second antenna radiator 90 may also be formed using laser reconstruction printing technology. Referring to FIG. 16, FIG. 16 is a schematic flowchart of a first method for fabricating an antenna radiator according to an embodiment of the application.

The fabrication method for the antenna radiator provided by the embodiment of the present application is configured to fabricate the second antenna radiator 90, and the fabrication method for the antenna radiator includes:

Step 110: using the back cover of the electronic device as a substrate, and selecting a target area on the substrate.

Herein, the projection of the target area on the support 50 can overlap with the projection of the first antenna radiator 80 on the support 50, so that the second antenna radiator 90 formed in the subsequent steps can be located right below the first antenna radiator 80, so the electromagnetic coupling between the first antenna radiator 80 and the second antenna radiator 90 can be stronger.

The shape of the target area may be a rectangle, and the shape of the target area may also be a special shape with a convex structure. The size of the target area may be slightly larger than the size of the second antenna radiator 90, and the redundant portion may be removed by laser correction in the subsequent steps.

Figure 17:
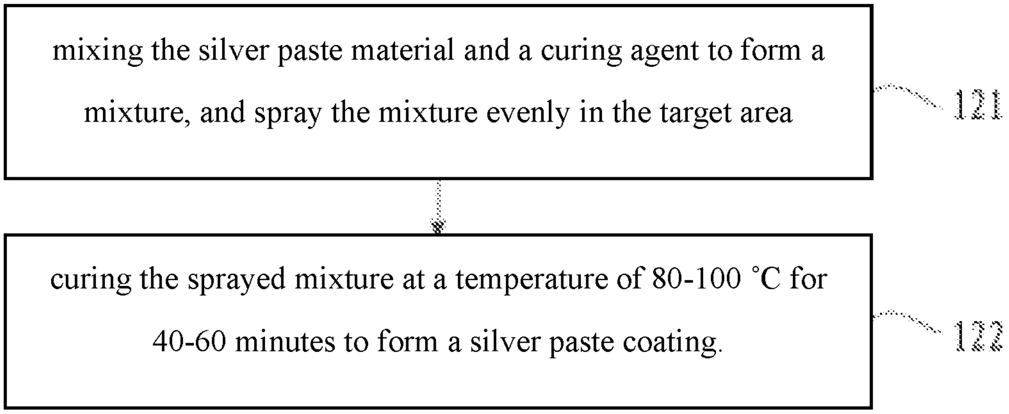
FIG. 17 is a schematic diagram of a second process of a method for fabricating an antenna radiator according to an embodiment of the application.

Step 120: spraying a silver paste material in the target area and form a silver paste coating;

Specifically, please refer to FIG. 17. FIG. 17 is a schematic diagram of a second flow of the method for fabricating an antenna radiator according to an embodiment of the application, and this step may include:

Step 121: mixing the silver paste material and a curing agent to form a mixture, and spray the mixture evenly in the target area; and Step 122: curing the sprayed mixture at a temperature of 80-100° C. for 40-60 minutes, a curing reaction occurs between the silver paste material and the curing agent, and the silver paste material is firmly attached to the back cover 70 to form a circuit-shaped silver Paste coating.

Herein, the curing agent may include aliphatic amine curing agent, polyamide curing agent, acid anhydride curing agent, and the like. The curing agent is added to the silver paste material, and the cured silver paste coating has excellent properties such as conductivity, hardness, adhesion, and bending resistance, so that the radio frequency performance of the second antenna radiator 90 is better.

The silver paste material may include conductive phase silver powder, matrix resin binder phase, solvent and other auxiliary agents. The matrix resin binder phase is the carrier of the conductive phase silver powder, which can provide the silver paste material with the basic fluidity and adhesion of the paste, and provide the basic mechanical properties of the paste to make the paste have a certain degree of film-forming, durability, resistance, and bending performance. The solvent can dissolve the binder phase of the matrix resin, so that the silver powder is uniformly dispersed in the polymer, and the viscosity of the conductive silver paste can be adjusted to improve the drying speed.

Specifically, the matrix resin binder phase may include epoxy resin binder phase, acrylic resin, alkyd resin, melamine formaldehyde resin, polyurethane resin, and the like. Solvents may include alcohols, lipids, ketones, diethanol butyl ether acetate, diethanol ethyl ether acetate, tetrahydrofuran, and the like.

The following uses epoxy resin as the matrix resin binder phase, tetrahydrofuran as the solvent, and polyethylene glycol as the active agent as an example to illustrate the fabrication method for the silver paste material of the present application:

adding a predetermined amount of epoxy resin in a reactor, and add a predetermined amount of tetrahydrofuran into the reactor while stirring;

adding tetrahydrofuran when the epoxy resin is completely dissolved, then adding a predetermined amount of silver powder to the reactor to form a mixture, adding a small amount of polyethylene glycol to the mixture, and stirring the mixture in the reactor to fabricate the silver paste material.

In the above method, the portions by weight of the raw materials of each component may be: 73-84 portions of the silver powder, 5-13 portions of the epoxy resin, 12-27 portions of the tetrahydrofuran, and the polyethylene glycol for 0.5-1 portion. When a silver paste material is prepared according to the above-mentioned raw materials, the conductive performance of the silver paste material is good, the resistance value is in a suitable range, and the silver powder can be uniformly dispersed in the epoxy resin. A stable bond is formed between the silver paste material and the silver paste material has a suitable viscosity and drying speed. When the silver paste material is sprayed on the back cover 70 under the action of the curing agent to form the second antenna radiator 90, the silver paste material can form a three-dimensional network of thermo-curing plastics, and the shrinkage rate during the curing reaction is small. The second antenna radiation 90 has better electrical conductivity and mechanical properties. Of course, the second antenna radiator 90 of the present application can also be made of other raw materials, and is not limited to the above raw materials and their weight fractions.

In the examples of this application, a viscosity of the silver paste material at 25° C. is 15-20 pascals. A fluidity of the silver paste material is better, and the viscosity of the silver paste material will not be too large, nor will it cause the silver paste material and the curing time is too long. A thixotropic coefficient of the silver paste material is 3.5-4, and the silver paste material is easy to solidify in the spraying process and form a uniform layer, so that the surface of the second antenna radiator 90 is flatter. The silver paste material adopts a 100-grid test, and the test result can be 5B. The adhesion performance of the silver paste material is good. The surface of the second antenna radiator 90 after curing is smoother, and the bonding force between the second antenna radiator 90 and the back cover 70 is stronger. The second antenna radiator 90 of the embodiment of the present application has excellent mechanical properties.

A silver paste antenna fabricated by the silver paste material has a Hegman fineness of less than 25 microns, and a volume resistance measured by the four-point electrode method is $2.0\times10^{-5}$ ohm·cm. In the silver paste antenna within this range, the bond between the silver powder and the matrix resin binder phase is relatively dense, the conductive performance of the silver paste antenna is good, and the resistance value of the silver paste antenna is also low, thereby making the second antenna body 90 of the present application has excellent electrical properties.

Step 130: performing a laser on the silver paste coating to form a second antenna radiator of the electronic device.

Through a three-dimensional laser, the redundant portion of the silver paste coating outside the circuit shape is removed by a laser, and finally a silver paste antenna with a high-precision circuit interconnection structure is formed.

In the method for fabricating the antenna radiator provided by the embodiment of the present application, the second antenna radiator 90 of the electronic device 100 can be formed by spraying the silver paste material directly in the target area of the back cover 70. Compared with the laser direct forming technology, the second antenna radiator 90 formed by the above method does not need to go through the step of laser-induced modification of the material. The fabrication method of the second antenna radiator 90 is simpler, and the restriction on the material of the back cover 70 is lower.

In addition, the silver paste material has lower volatile energy and better environmental performance.

In the description of this application, it should be understood that terms such as "first" and "second" are only used to distinguish similar objects, and cannot be understood as indicating or implying relative importance or implicitly indicating the indicated technology The number of features.

The method for fabricating the electronic device and the antenna radiator provided in the embodiments of the present application has been described in detail above. Specific examples are used in this article to describe the principle and implementation of the application, and the description of the above examples is only used help understand the application. At the same time, for those skilled in the art, according to the idea of the application, there will be changes in the specific implementation and the scope of application. In summary, the content of this specification should not be construed as a limitation to the application.

What is claimed is:

1. An electronic device, comprising:

a circuit board, wherein the circuit board comprises a signal source and a grounding point;

a support, wherein the support is located on a side of the circuit board and the support supports the circuit board;

a first antenna radiator, wherein the first antenna radiator is located on the support, the first antenna radiator comprises a feeding terminal and a ground terminal, the feeding terminal is electrically connected to the signal source, the ground terminal is electrically connected to the grounding point, and the first antenna radiator is configured to radiate a wireless signal of a first wavelength;

a back cover, wherein the back cover is located on a side of the support away from the circuit board; and a second antenna radiator, wherein the second antenna radiator is located on the side of the back cover facing the first antenna radiator, the second antenna radiator is not electrically connected to the grounding point, and the second antenna radiator and the first antenna radiator are electrically connected through electromagnetic coupling when the first antenna radiator radiates a wireless signal of the first wavelength, the second antenna radiator is configured to generate and radiate a wireless signal of the second wavelength through resonance, and the second wavelength is half of the first wavelength.

2. The electronic device according to claim 1, wherein a material of the second antenna radiator comprises silver paste.

3. The electronic device according to claim 1, wherein the second antenna radiator comprises a rectangular portion, the rectangular portion comprises a first side and a second side, and a length of the first side is greater than a length of the second side.

4. The electronic device according to claim 3, wherein the second antenna radiator further comprises a protruding portion located on the first side of the rectangular portion, and the rectangular portion and the protruding portion are an integrally formed structure.

5. The electronic device according to claim 4, wherein an orthographic projection of the protrusion portion on the support overlaps an orthographic projection of the first antenna radiator on the support.

6. The electronic device according to claim 5, wherein the first antenna radiator comprises a first end and a second end, the ground terminalis located at the first end, and the feeding terminalis located between the first end and the second end.

7. The electronic device according to claim 6, wherein a distance between the feeding terminal and the first end is a first distance, and a distance between the feeding terminal and the second end is a second distance, and the first distance is equal to the second distance.

8. The electronic device according to claim 1, further comprising:

a metal middle frame, wherein the metal middle frame is located on a side of the back cover facing the support, the support and the circuit board are arranged on the metal middle frame, and a gap is formed between the second antenna radiator and edges of the middle frame.

9. The electronic device according to claim 8, wherein a distance between the second antenna radiator and an edge of the metal middle frame is 5 mm.

10. The electronic device according to claim 9, wherein the electronic device further comprises a third antenna radiator and a fourth antenna radiator, the third antenna radiator is disposed on the metal middle frame, the fourth antenna radiator is disposed on the circuit board, and the first antenna radiator, the second antenna radiator, the third antenna radiator, and the fourth antenna radiator are configured to implement multiple input and output transmission of wireless signals.

11. The electronic device according to claim 1, wherein the number of the first antenna radiator is multiple, the number of the second antenna radiator is equal to the number of the first antenna radiator, and the number of the first antenna radiator and the second antenna radiator are configured to implement multiple input and output transmission of wireless signals.

12. The electronic device according to claim 1, further comprising:

a feeding point elastic sheet, wherein one end of the feeding point elastic sheet is connected with the first antenna radiator, and the other end of the feeding point elastic sheet is connected with the signal source.

13. A method for fabricating an antenna radiator, which is used to fabricating a second antenna radiator of an electronic device, and the electronic device comprises:

a circuit board, wherein the circuit board comprises a signal source and a grounding point;

a support, wherein the support is located on a side of the circuit board and the support supports the circuit board;

a first antenna radiator, wherein the first antenna radiator is located on the support, the first antenna radiator comprises a feeding terminal and a ground terminal, the feeding terminal is electrically connected to the signal source, the ground terminal is electrically connected to the grounding point, and the first antenna radiator is configured to radiate a wireless signal of a first wavelength;

a back cover, wherein the back cover is located on a side of the support away from the circuit board; and a second antenna radiator, wherein the second antenna radiator is located on the side of the back cover facing the first antenna radiator, the second antenna radiator is not electrically connected to the grounding point, and the second antenna radiator and the first antenna radiator are electrically connected through electromagnetic coupling when the first antenna radiator radiates a wireless signal of the first wavelength, the second antenna radiator is configured to generate and radiate a wireless signal of the second wavelength through resonance, and the second wavelength is half of the first wavelength; and wherein the method for fabricating an antenna radiator comprises:

using the back cover of the electronic device as a substrate and selecting a target area on the substrate;

spraying a silver paste material in the target area and forming a silver paste coating; and performing plasma laser on the silver paste coating to form the second antenna radiator.

14. The method for fabricating an antenna radiator according to claim 13, wherein the step of spraying the silver paste material in the target area and forming a silver paste coating comprises:

mixing the silver paste material and a curing agent to form a mixture, and spraying the mixture uniformly in the target area; and curing the sprayed mixture at a temperature of 80° C. to 100° C. for 40 minutes to 60 minutes to form the silver paste coating.

15. The method for fabricating an antenna radiator according to claim 13, wherein a material of the second antenna radiator comprises silver paste.

16. The method for fabricating an antenna radiator according to claim 13, wherein the second antenna radiator comprises a rectangular portion, the rectangular portion comprises a first side and a second side, and a length of the first side is greater than a length of the second side.

17. The method for fabricating an antenna radiator according to claim 16, wherein the second antenna radiator further comprises a protruding portion, the protruding portion is located on a long side of the rectangular portion, and the rectangular portion and the protruding portion are an integrally formed structure.

18. The method for fabricating an antenna radiator according to claim 17, wherein an orthographic projection of the protruding portion on the support overlaps an orthographic projection of the first antenna radiator on the support.

19. The method for fabricating an antenna radiator according to claim 18, wherein the first antenna radiator comprises a first end and a second end, the ground terminalis located at the first end, and the feeding terminalis located between the first end and the second end.

20. The method for fabricating an antenna radiator according to claim 19, wherein a distance between the feeding terminal and the first end is a first distance, and a distance between the feeding terminal and the second end is a second distance, and the first distance is equal to the second distance.

* * * * *